US012786330B2

(12) United States Patent
Horiguchi

(10) Patent No.: US 12,786,330 B2
(45) Date of Patent: Nov. 3, 2026

(54) IMAGE READING APPARATUS

(71) Applicant: KYOCERA Document Solutions Inc., Osaka (JP)

(72) Inventor: Yasuyuki Horiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 159 days.

(21) Appl. No.: 19/013,328

(22) Filed: Jan. 8, 2025

(65) Prior Publication Data

US 2025/0240375 A1 Jul. 24, 2025

(30) Foreign Application Priority Data

Jan. 23, 2024 (JP) ................................. 2024-007986

(51) Int. Cl.

| | |
|---|---|
| ***H04N 1/62*** | (2006.01) |
| ***H04N 1/00*** | (2006.01) |
| ***H04N 1/028*** | (2006.01) |
| ***H04N 1/03*** | (2006.01) |
| ***H04N 1/031*** | (2006.01) |
| ***H04N 1/04*** | (2006.01) |
| ***H04N 1/047*** | (2006.01) |

(52) U.S. Cl.

CPC ..... *H04N 1/00748* (2013.01); *H04N 1/00816* (2013.01); *H04N 1/02855* (2013.01); *H04N 1/031* (2013.01); *H04N 1/0473* (2013.01); *H04N 1/626* (2013.01); *H04N 2201/0094* (2013.01)

(58) Field of Classification Search

CPC ........... H04N 1/00748; H04N 1/02855; H04N 1/00816; H04N 1/031; H04N 1/0473; H04N 1/1061; H04N 1/626; H04N 2201/0094

See application file for complete search history.

(56) References Cited

U.S. PATENT DOCUMENTS

| | | | | |
|---|---|---|---|---|
| 9,848,097 | B2 * | 12/2017 | Ozaki | H04N 1/40056 |
| 2006/0232835 | A1 * | 10/2006 | Goma | H04N 1/46 358/1.4 |
| 2018/0035000 | A1 * | 2/2018 | Harada | H04N 1/21 |
| 2018/0084152 | A1 * | 3/2018 | Yoshida | H04N 1/4072 |

FOREIGN PATENT DOCUMENTS

JP 2021005119 A 1/2021

OTHER PUBLICATIONS

IP.com search history (Year: 2026).*
Orbit.com search history (Year: 2026).*

* cited by examiner

*Primary Examiner* — Moustapha Diaby
(74) *Attorney, Agent, or Firm* — Alleman Hall LLP

(57) ABSTRACT

Reference portions are arranged in a reference area outside a main area in a main scanning direction, each having a lower surface of one of a plurality of determination colors. A reference data offset value is set based on reference pixel data of the reference area obtained when a light emitting unit of a scanning unit is not caused to emit light. A color determination process is executed to correct the reference pixel data in line image data obtained when the light emitting portion is caused to emit light with the reference data offset value, and to determine which determination color the corrected reference pixel data is data of. A unit drive device executes driving operations that are sequentially selected from a plurality of trial driving operations according to the determination result of the color determination process, and positions the scanning unit at a home position.

10 Claims, 8 Drawing Sheets

IMAGE READING APPARATUS

INCORPORATION BY REFERENCE

This application is based upon and claims the benefit of priority from the corresponding Japanese Patent Application No. 2024-007986 filed on Jan. 23, 2024, the entire contents of which are incorporated herein by reference.

BACKGROUND

The present disclosure relates to an image reading apparatus having a function of positioning a scanning unit at a home position.

The image reading apparatus may have a function of executing a stationary document reading process. The stationary document reading process is a process for reading an image of a document placed on a platen glass. The stationary document reading process is also called a flatbed type image reading process.

In the stationary document reading process, a unit driving device moves a scanning unit including a light emitting portion and a light guiding member formed along a main scanning direction from a predetermined home position toward below the platen glass.

The image reading apparatus further includes an image sensor, an Analog Front End (AFE), and a data processing portion. The image sensor receives light guided by the light guiding member and outputs a line image signal representing the amount of received light. The AFE converts the line image signal into line image data including a plurality of digital pixel data. The data processing portion processes the line image data.

Note that the scanning unit may include a contact image sensor unit. The contact image sensor unit includes the light emitting portion, the light guiding member that is a condenser lens, and a CMOS type image sensor.

The home position is a position shifted in a sub-scanning direction with respect to an area below the platen glass. The movement speed of the scanning unit stabilizes by the time the scanning unit moves from the home position to the area below the platen glass.

Therefore, the unit driving device needs to position the scanning unit at the home position before the stationary document reading process is executed.

For example, it is known that a mark indicating the home position is formed on a reference plate for shading correction that is arranged next to the platen glass. In this case, the data processing portion detects that the scanning unit has reached the home position by detecting the mark from the line image data.

SUMMARY

An image reading apparatus according to one aspect of the present disclosure includes a platen plate portion, a scanning unit, a main image sensor, a unit drive device, a control portion, and a plurality of reference portions. The platen plate portion is a transparent member on which a document is placed. The scanning unit includes a light emitting portion and a light guiding portion, each of which is arranged along a main scanning direction, and the scanning unit is movable in a first direction intersecting the main scanning direction and a second direction opposite to the first direction in a movable area including an area below the platen plate portion. The main image sensor receives light guided by the light guiding portion and outputs a line image signal representing an amount of received light. The unit driving device moves the scanning unit in the first direction or the second direction within the movable area. The control portion controls the main image sensor and the unit driving device, and processes line image data including a plurality of pixel data corresponding to the line image signal output by the main image sensor. The plurality of reference portions are arranged along the first direction in a reference area outside a main area on the platen plate portion in the main scanning direction on which the document can be placed, and each has a lower surface of any one of a plurality of predetermined determination colors. The control portion sets a reference data offset value based on one or more reference pixel data of the reference area in the line image data obtained in a state where the light emitting portion is not caused to emit light. The control portion further executes a color determination process to correct the reference pixel data in the line image data obtained in a state where the light emitting portion is caused to emit light with the reference data offset value, and to determine which of the plurality of determination colors the corrected reference pixel data is data of. The control portion even further positions the scanning unit at a home position on the first direction side relative to the platen plate portion by causing the unit driving device to execute a plurality of driving operations that are sequentially selected from a plurality of trial driving operations that each differ in direction or distance by which the scanning unit is moved according to the determination result of the color determination process.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments according to the present disclosure will be described with reference to the drawings. Note that the following embodiments are examples according to the present disclosure and do not limit the technical scope of the present disclosure.

First Embodiment

An image reading apparatus 1 according to a first embodiment executes an image reading process for reading an image of a document 9. For example, the image reading apparatus 1 may be configured as a part of an image processing apparatus such as a copying machine, a facsimile machine, or a multifunction peripheral.

In the following description, an image read from a document 9 by the image reading process of the image reading apparatus 1 is referred to as a read image.

[Configuration of Image Reading Apparatus 1]

Figure 1:
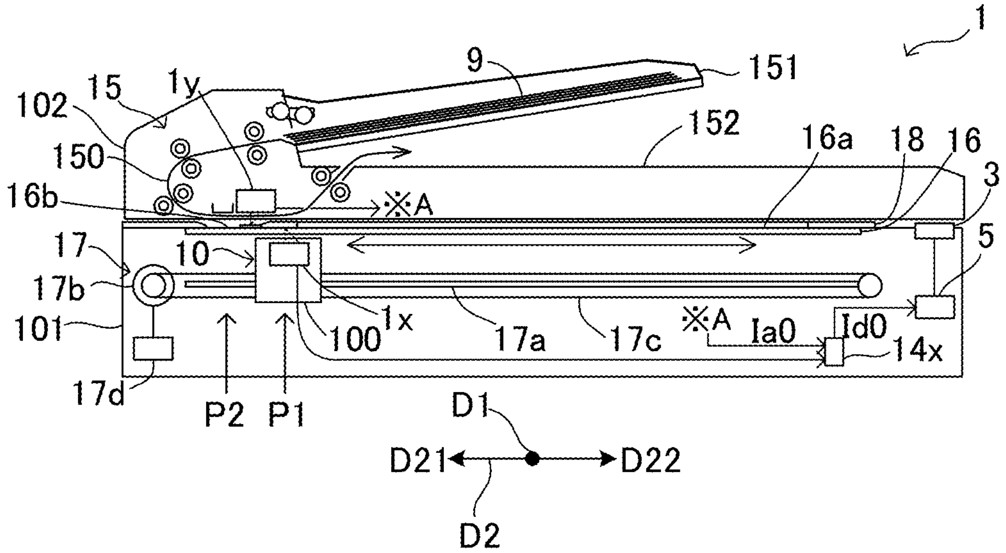
FIG. 1 is a diagram showing a configuration of an image reading apparatus according to a first embodiment.

In the present embodiment, the image reading apparatus 1 includes a main body 101, a document cover 102, a scanning unit 10, an AFE (Analog Front End) 14*x*, a document conveying device 15, a platen glass portion 16*a*, a contact glass portion 16*b*, and a unit driving device 17 (see FIG. 1).

Furthermore, the image reading apparatus 1 also includes a user interface device 3 and a control device 5.

A longitudinal direction of the scanning unit 10 is a main scanning direction D1. The scanning unit 10 includes a first Contact Image Sensor unit (CIS unit) 1*x* and a carriage 100 that supports the first CIS unit 1*x*.

In FIG. 1, a direction into the drawing is a main scanning direction D1, and a direction to the left and right is a sub-scanning direction D2. The sub-scanning direction D2 is a direction that intersects with the main scanning direction D1. In the present embodiment, the sub-scanning direction D2 is a direction perpendicular to the main scanning direction D1.

Figure 5:
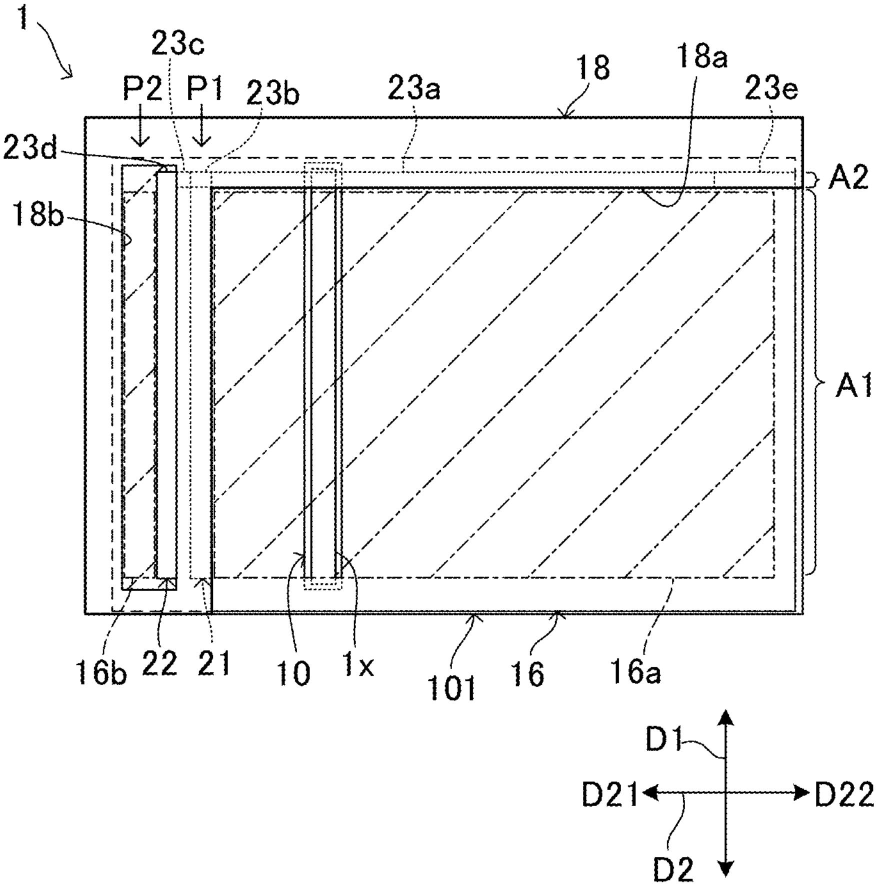
FIG. 5 is a top view of a main body of the image reading apparatus according to the first embodiment.
Figure 6:
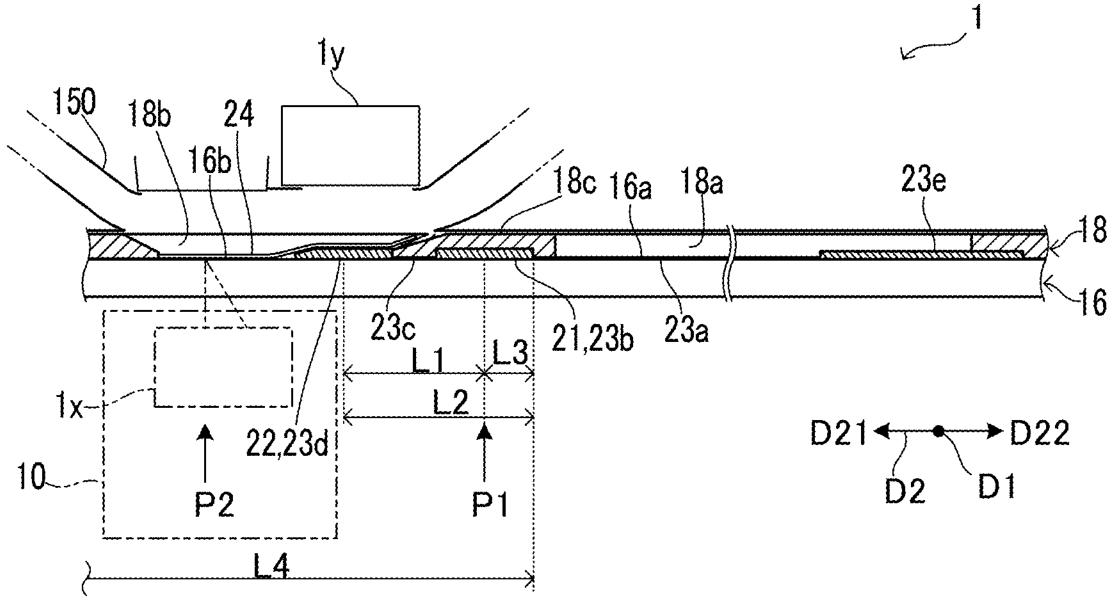
FIG. 6 is a cross-sectional view of an upper portion of the main body of the image reading apparatus according to the first embodiment.

In FIGS. 1, 5 and 6, a first direction D21 is one direction along the sub-scanning direction D2, and a second direction D22 is the other direction along the sub-scanning direction D2. That is, the second direction D22 is opposite to the first direction D21.

The main body 101 is a housing that houses the scanning unit 10 and the unit driving device 17. The platen glass portion 16*a* and the contact glass portion 16*b* form part of an upper surface of the main body 101.

The platen glass portion 16*a* and the contact glass portion 16*b* are in the form of a transparent plate. The platen glass portion 16*a* is a portion on which the document 9 is placed. The platen glass portion 16*a* is an example of a platen plate portion.

The contact glass portion 16*b* is arranged on the first direction D21 side with respect to the platen glass portion 16*a*. The contact glass portion 16*b* is an example of a contact plate portion.

In the present embodiment, a single transparent glass plate 16 includes the platen glass portion 16*a* and the contact glass portion 16*b* (see FIGS. 1, 5 and 6). The main body 101 includes a glass cover member 18 arranged overlying an upper surface of the glass plate 16. The glass cover member 18 is a synthetic resin member.

The glass cover member 18 is formed with a first opening 18*a* and a second opening 18*b* (see FIGS. 5 and 6). The first opening 18*a* exposes a part of the glass plate 16 including the platen glass portion 16*a*. The second opening 18*b* exposes another part of the glass plate 16, including the contact glass portion 16*b*.

In the example shown in FIG. 5, the first opening 18*a* is a cutout portion formed by cutting inward from a front surface side and a side surface side in the second direction D22 of the main body 101. Thus, by sliding the document 9 from the platen glass portion 16*a* to the front surface side or the side surface side, the document 9 can be easily removed from the upper portion of the platen glass portion 16*a*. The first opening 18*a* is a rectangular hole.

Note that the first opening 18*a* may be a cutout portion formed by cutting the main body 101 inwardly from the front surface side thereof in a rectangular shape. In this case, the document 9 can be removed from the platen glass portion 16*a* by sliding the document 9 from the platen glass portion 16*a* to the front surface side.

The scanning unit 10 is supported by the main body 101. The scanning unit 10 is supported so as to be movable in the first direction D21 and the second direction D22 in a movable area extending from below the platen glass portion 16*a* to below the contact glass portion 16*b*.

The unit driving device 17 moves the scanning unit 10 in the first direction D21 or the second direction D22 within the movable area. The unit drive device 17 includes a unit support portion 17*a*, a motor 17*b*, a power transmission mechanism 17*c*, and a motor drive circuit 17*d*.

The unit support portion 17*a* supports the scanning unit 10 so as to be movable along the sub-scanning direction D2. The motor 17*b* is a drive source for the mechanism that moves the scanning unit 10. The power transmission mechanism 17*c* converts the rotational force of the motor 17*b* into a force along the sub-scanning direction D2 and transmits the force to the scanning unit 10.

When the motor 17*b* rotates in a first rotation direction, the scanning unit 10 moves in the first direction D21. When the motor 17*b* rotates in a second rotation direction, the scanning unit 10 moves in the second direction D22.

The motor drive circuit 17*d* rotates the motor 17*b* in accordance with a control command from the control device 5. The control device 5 operates the unit driving device 17 by outputting the control command.

The document cover 102 is supported so as to be rotatable between a closed position and an open position. In the closed position, the document cover 102 covers the upper surfaces of the platen glass portion 16*a* and the contact glass portion 16*b*. In the open position, the document cover 102 exposes the upper surfaces of the platen glass portion 16*a* and the contact glass portion 16*b*.

The image reading apparatus 1 is capable of performing a stationary document reading process. In the stationary document reading process, the scanning unit 10 moves along the platen glass portion 16*a*, and the first CIS unit 1*x* reads an image on a lower surface of the document 9 placed on the platen glass portion 16*a*.

The document conveying device 15 is provided in the document cover 102. The document conveying device 15 feeds the document 9 on a supply tray 151 to a conveying path 150. Furthermore, the document conveying device 15 conveys the document 9 along the conveying path 150 via the upper surface of the contact glass portion 16*b*. Furthermore, the document conveying device 15 conveys the document 9 from the conveying path 150 onto a discharge tray 152.

The image reading apparatus 1 is capable of executing a conveyed document reading process in a state in which the document cover 102 is closed. In the conveyed document reading process, the unit driving device 17 holds the scanning unit 10 below the contact glass portion 16*b*, and the document conveying device 15 conveys the document 9 along the conveying path 150. Furthermore, the first CIS unit 1*x* reads the image on the lower surface of the document 9 passing over the contact glass portion 16*b*.

The image reading apparatus 1 further includes a second CIS unit 1*y* provided in the document cover 102. The second CIS unit 1*y* is arranged facing a portion of the conveying path 150 that is aligned with the main body 101.

In the conveyed document reading process, the second CIS unit 1*y* reads an image on the upper surface of the document 9 passing over the contact glass portion 16*b*.

Figure 2:
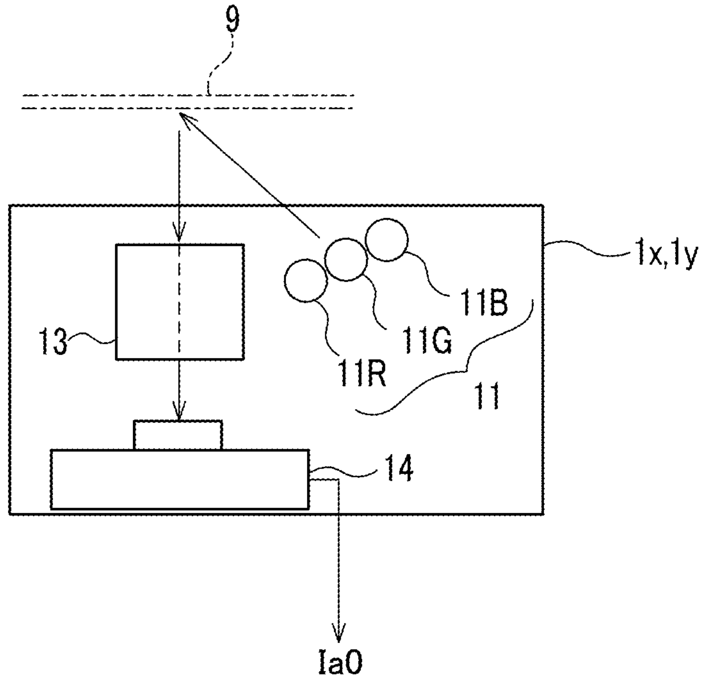
FIG. 2 is a configuration diagram of a CIS unit.

As shown in FIG. 2, each of the first CIS unit 1*x* and the second CIS unit 1*y* includes a light emitting portion 11, a lens 13, and an image sensor 14.

The light emitting portion 11, the lens 13 and the image sensor 14 are arranged along the main scanning direction D1. The longitudinal direction of the light emitting portion 11, the lens 13 and the image sensor 14 is the main scanning direction D1.

The light emitting portion 11 emits light. The light emitting portion 11 of the first CIS unit 1*x* emits light upward. The light emitting portion 11 of the second CIS unit 1*y* emits light downward.

The light emitted from the light emitting portion 11 is reflected by the document 9. For example, the light emitting portion 11 includes a light source and a light guiding member arranged along the main scanning direction D1. The light guiding member guides the light from the light source incident on one end in the main scanning direction D1 and radiates the light in a direction intersecting the main scanning direction D1. For example, the light guiding member is a synthetic resin member.

The lens 13 is a condenser lens that guides reflected light of light emitted from the light emitting portion 11 to the image sensor 14. The reflected light is light that is diffusely reflected by the document 9. In addition, the reflected light may be light that is diffusely reflected by a first white reference portion 21, a second white reference portion 22, a first reference portion 23*a*, a second reference portion 23*b*, a third reference portion 23*c*, or a fourth reference portion 23*d*, which will be described later.

The image sensor 14 receives the reflected light and detects the amount of the reflected light. Furthermore, the image sensor 14 outputs a line image signal la0 representing the detection result of the amount of reflected light to the AFE 14*x*.

In the present embodiment, the image sensor 14 is a CMOS type line sensor. The lens 13 is an example of a light guiding member that guides the reflected light to the image sensor 14.

The image sensor 14 of the first CIS unit 1*x* is an example of a main image sensor. The image sensor 14 of the second CIS unit 1*y* is an example of a sub-image sensor.

The AFE 14*x* converts an analog line image signal la0 into digital line image data Id0, and outputs the line image data Id0 to the control device 5. The line image data Id0 includes a plurality of pixel data for one line in the main scanning direction D1.

Line image data Id0 for a plurality of lines corresponding to one page of the document 9 is data of the read image corresponding to one page of the document 9.

The image sensor 14 reads the image of the document 9 as a color image. Therefore, the read image data is color image data that represents the amount of reflected light of the three colors of red, green, and blue.

In the present embodiment, the light emitting portion 11 includes a red light emitting portion 11R, a green light emitting portion 11G, and a blue light emitting portion 11B that emit red, green, and blue light, respectively. Line image data Id0 of three colors obtained when the red light emitting portion 11R, green light emitting portion 11G, and blue light emitting portion 11B emit light in sequence constitute the data of the read image.

Figure 3:
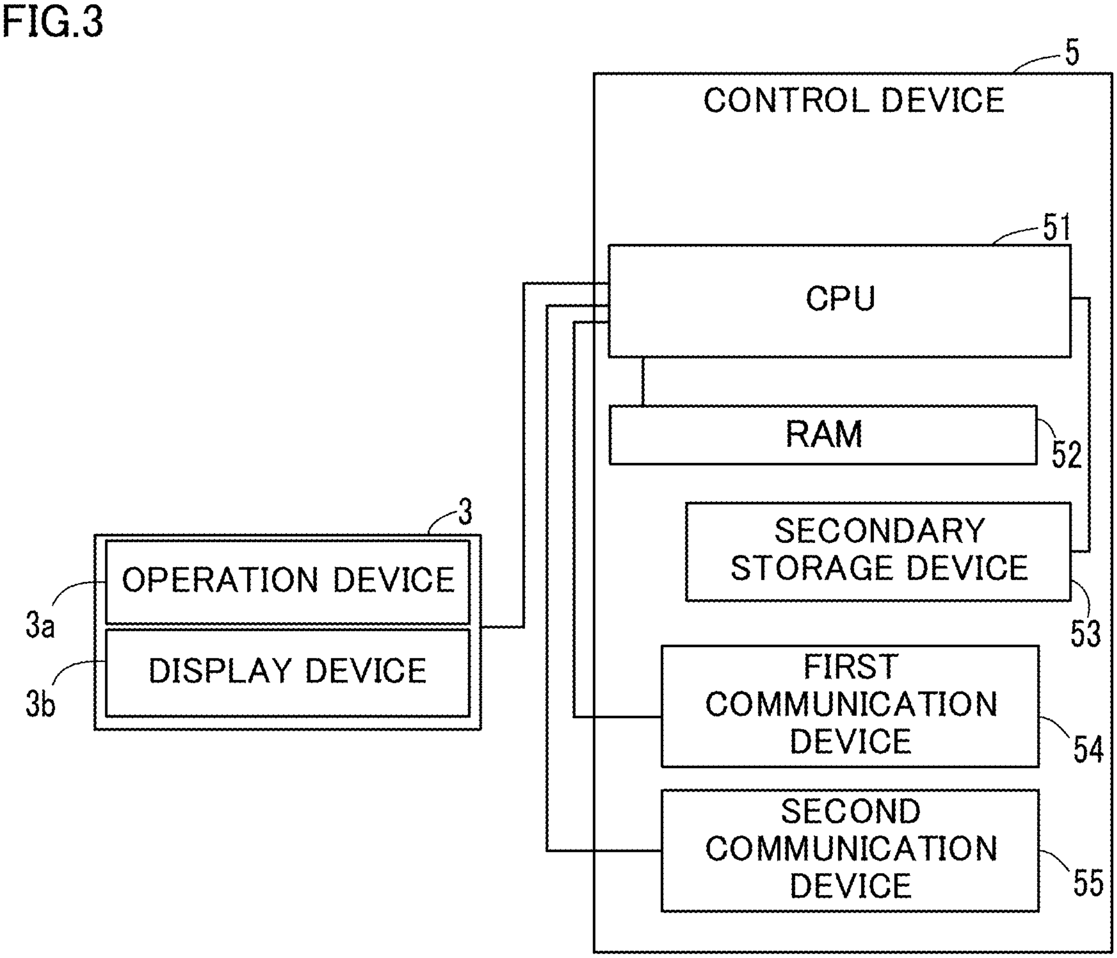
FIG. 3 is a block diagram showing a configuration of a user interface and a control device in the image reading apparatus according to the first embodiment.

As shown in FIG. 3, the user interface device 3 includes an operation device 3*a* and a display device 3*b*. The operation device 3*a* is a device that receives operations by a person, and includes, for example, operation buttons, a touch panel, and the like.

The display device 3*b* includes a display panel, such as a liquid crystal panel, capable of displaying images and other information. Note that the human operation includes operation by a human hand, operation by a human voice, operation by a human line of sight, and the like.

The control device 5 includes a Central Processing Unit (CPU) 51, a RAM 52, a secondary storage device 53, a first communication device 54, and a second communication device 55.

The secondary storage device 53 is a computer-readable non-volatile storage device. The secondary storage device 53 is capable of storing computer programs and various types of data. For example, one or both of a Solid State Drive (SSD) and a hard disk drive are employed as the secondary storage device 53.

The CPU 51 is a processor that executes various types of data processing and control by executing computer programs stored in the secondary storage device 53. Note that it is also possible that another processor such as a DSP may execute the data processing and control instead of the CPU 51.

The RAM 52 is a computer-readable volatile storage device. The RAM 52 is accessed by the CPU 51. The RAM 52 temporarily stores data to be processed by the CPU 51 and data generated by the CPU 51. The RAM 52 has a faster data access speed than the secondary storage device 53.

The CPU 51 is capable of communicating with a host device (not shown), which is an external device, via a network such as a Local Area Network (LAN). The host device is a computer capable of communicating with the image reading apparatus 1.

The first communication device 54 is an interface device that relays signal transmission or data communication between the CPU 51 and other devices included in the image reading apparatus 1. For example, the CPU 51 transmits a control command to the motor drive circuit 17*d* via the first communication device 54. In addition, the CPU 51 acquires the line image data Id0 from the AFE 14*x* via the first communication device 54.

The second communication device 55 is a communication interface device that communicates with the host device via the network. The CPU 51 performs all data transmission and reception between the host device and the CPU 51 via the second communication device 55.

For example, the CPU 51 transmits data of the read image obtained by the image reading process to the host device via the second communication device 55.

Figure 4:
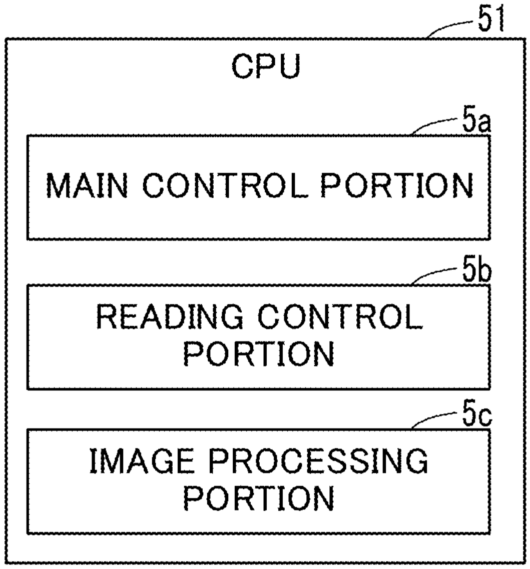
FIG. 4 is a block diagram showing a configuration of a processing module in a CPU of the image reading apparatus according to the first embodiment.

The CPU 51 includes a plurality of processing modules that are achieved by executing the computer programs. The plurality of processing modules include a main control portion 5*a*, a reading control portion 5*b*, and an image processing portion 5*c* (see FIG. 4).

The main control portion 5*a* mainly monitors operations on the operation device 3*a* and data reception by the second communication device 55, and when an operation or data reception is detected, controls the start of processing according to the detected content.

The reading control portion 5*b* controls the motor drive circuit 17*d* and the first CIS unit 1*x* to cause the image reading apparatus 1 to execute the stationary document reading process. Furthermore, the reading control portion 5*b* controls the document conveying device 15, the first CIS unit 1*x*, and the second CIS unit 1*y* to cause the image reading apparatus 1 to execute the conveyed document reading process.

The image processing portion 5*c* executes various types of processes on the line image data Id0 obtained by the stationary document reading process or the conveyed document reading process. The image processing portion 5*c* is an example of a data processing portion that processes line image data Id0 including a plurality of pixel data corresponding to the line image signal la0.

As described above, the CPU 51 controls the first CIS unit 1*x*, the second CIS unit 1*y* and the unit driving device 17, and processes the line image data Id0. The line image data Id0 includes a plurality of pixel data corresponding to the line image signal la0 output by the image sensor 14. The CPU 51 is an example of a control portion.

The reading control portion 5*b* controls the first CIS unit 1*x* and the motor drive circuit 17*d* to move the scanning unit 10 to a predetermined home position P1. The home position P1 is an initial position of the scanning unit 10, and is a position on the first direction D21 side with respect to the platen glass portion 16*a*.

In the stationary document reading process, the reading control portion 5*b* moves the scanning unit 10 in the second direction D22 from the home position P1 to an end position of a reading range (see FIGS. 1, 5 and 6).

The reading control portion 5*b* causes the first CIS unit 1*x* to start the image reading process at a timing when the scanning unit 10 moves a predetermined approach distance from the home position P1.

The approach distance is the distance from the home position P1 to a position corresponding to a leading edge of the document 9 on the platen glass portion 16*a*. While the scanning unit 10 moves the approach distance from the home position P1, the moving speed of the scanning unit 10 becomes stable.

Furthermore, the reading control portion 5*b* moves the scanning unit 10 in the first direction D21 from the end position to the home position P1.

In the conveyed document reading process, the reading control portion 5*b* moves the scanning unit 10 from the home position P1 to the reading position P2 below the contact glass portion 16*b*, and then stops the scanning unit 10 at the reading position P2 (see FIGS. 1, 5 and 6).

The image reading apparatus 1 further includes a first white reference portion 21 and a second white reference portion 22 each arranged along the main scanning direction D1 (see FIGS. 5 and 6). The first white reference portion 21 has a white lower surface, and the second white reference portion 22 has a white upper surface. For example, the first white reference portion 21 and the second white reference portion 22 are each a sheet or plate made of synthetic resin.

The first white reference portion 21 is arranged on the first direction D21 side with respect to the platen glass portion 16*a*. The first white reference portion 21 is arranged on the lower surface of a portion of the glass cover member 18 on the first direction D21 side with respect to the first opening 18*a* (see FIG. 6).

More specifically, the first white reference portion 21 is arranged on the lower surface of a portion of the glass cover member 18 between the first opening 18*a* and the second opening 18*b* (see FIG. 6). That is, the first white reference portion 21 is arranged in an area between the platen glass portion 16*a* and the contact glass portion 16*b* in the sub-scanning direction D2.

The second white reference portion 22 is arranged in an area within the second opening 18*b* of the glass cover member 18 on the upper surface of the glass plate 16, adjacent to the contact glass portion 16*b* on the second direction D22 side (see FIG. 6). That is, the second white reference portion 22 is arranged in an area between the platen glass portion 16*a* and the contact glass portion 16*b* in the sub-scanning direction D2.

In the present embodiment, the second white reference portion 22 is arranged at a distance from the first white reference portion 21 on the first direction D21 side.

As shown in FIG. 6, the main body 101 further includes a transparent film 24 adhered to a portion of the upper surface of the main body 101. The transparent film 24 covers the upper surface of the contact glass portion 16*b* and an upper surface of the second white reference portion 22.

The transparent film 24 covers a stepped portion between the upper surface of the contact glass portion 16*b* and the edge of the second white reference portion 22, forming an inclined surface. Thus, the transparent film 24 prevents the document 9 being conveyed by the document conveying device 15 from getting caught in the stepped portion.

The home position P1 is a position below the first white reference portion 21 (see FIG. 6). The second CIS unit 1*y* is arranged facing the upper surface of the second white reference portion 22 (see FIG. 6).

The lower surface of the first white reference portion 21 and the upper surface of the second white reference portion 22 are uniform white surfaces with high diffuse reflectance.

The image processing portion 5*c* executes shading correction for the first CIS unit 1*x* using the line image data Id0 obtained by the first CIS unit 1*x* when the scanning unit 10 is at the home position P1. The shading correction is a process for setting a correction coefficient for the line image data Id0.

Furthermore, the image processing portion 5*c* executes shading correction for the second CIS unit 1*y* by using the line image data Id0 obtained by the second CIS unit 1*y* when the document 9 is not being conveyed.

As a reference example, it is possible to form a mark representing the home position P1 on the first white reference portion 21. In this reference example, the image processing portion 5*c* is able to detect that the scanning unit 10 has reached the home position P1 by detecting the mark from the line image data Id0.

A mark detection process for detecting a specific mark from the line image data Id0 takes a certain amount of time. Therefore, in a case in which the unit driving device 17 executes a process for moving the scanning unit 10 as required in response to the result of the mark detection process, it takes a relatively long time to position the scanning unit 10.

However, it is desirable to quickly position the scanning unit 10 at the home position P1.

In addition, it is also desirable for the unit driving device 17 to move the scanning unit 10 to the home position P1 without causing the scanning unit 10 to collide with one end of the movable area.

On the other hand, providing a dedicated sensor for detecting that the scanning unit 10 has reached the home position P1 is not preferable because it would increase the number of parts.

In addition, the image reading apparatus 1 also includes a configuration for executing the conveyed document reading process. That is, the image reading apparatus 1 includes the contact glass portion 16*b* and the document conveying device 15. As described above, the document conveying device 15 conveys the document 9 along the conveying path 150 via the upper surface of the contact glass portion 16*b*.

In a case in which the conveyed document reading process is executed, the unit driving device 17 positions the scanning unit 10 at the reading position P2 below the contact glass portion 16*b*, and the document conveying device 15 conveys the document 9. The image sensor 14 of the first CIS unit 1*x* reads the image of the document 9 passing over the contact glass portion 16*b*.

When the scanning unit 10 is located below the platen glass portion 16*a* or the contact glass portion 16*b*, the line image data Id0 is in an unspecified state. Thus, even in a case in which there are a plurality of positions within the movable area of the scanning unit 10 where the line image data Id0 is unspecified, it is desirable to quickly position the scanning unit 10 at the home position P1.

The image reading apparatus 1 has a configuration for quickly positioning the scanning unit 10 at the home position P1 without causing the scanning unit 10 to collide with one end of the movable area. The configuration will be described below.

As shown in FIGS. 5 and 6, the image reading apparatus 1 includes a first reference portion 23*a*, a second reference portion 23*b*, a third reference portion 23*c*, and a fourth reference portion 23*d*.

The first reference portion 23*a* is arranged along a side edge that forms one end of the platen glass portion 16*a* in the main scanning direction D1, and has a lower surface of a first color. In the present embodiment, the first color is black.

The second reference portion 23*b* is arranged adjacent to the first reference portion 23*a* in the first direction D21. The second reference portion 23*b* has a lower surface of a second color different from the first color. In the present embodiment, the second color is white.

Note that the first color may be a color other than black. Similarly, the second color may be a color other than white. For example, the first color may be a dark black or brown color having low light reflectance, and the second color may be a light white or yellow color having low light reflectance.

The third reference portion 23*c* is arranged adjacent to the second reference portion 23*b* in the first direction D21. The third reference portion 23*c* has a lower surface of the first color. In the present embodiment, the lower surface of the third reference portion 23*c* is black in color.

The fourth reference portion 23*d* is arranged adjacent to the third reference portion 23*c* in the first direction D21. The fourth reference portion 23*d* has a lower surface of the second color. In the present embodiment, the lower surface of the fourth reference portion 23*d* is white in color.

In the present embodiment, the first white reference portion 21 includes the second reference portion 23*b*. That is, one end of the first white reference portion 21 in the main scanning direction D1 is the second reference portion 23*b*. Similarly, the second white reference portion 22 includes the fourth reference portion 23*d*. That is, one end of the second white reference portion 22 in the main scanning direction D1 is the fourth reference portion 23*d*. The upper and lower surfaces of the second white reference portion 22 are white.

The image reading apparatus 1 further includes a terminal reference portion 23*e* (see FIGS. 5 and 6). The terminal reference portion 23*e* is arranged adjacent to the first reference portion 23*a* in the second direction D22 in an area at the end of the movable area in the second direction D22.

The length of the terminal reference portion 23*e* in the sub-scanning direction D2 is equal to or greater than the distance L4 from the end of the movable area in the first direction D21 to the end of the first reference portion 23*a* in the first direction D21 (see FIG. 6).

The terminal reference portion 23*e* has a lower surface of a specific color different from the first color and the second color. For example, the specific color is red, green, blue, yellow, magenta, or cyan. The specific color is an example of a third color that is different from the first color and the second color.

In the following description, the area in the main scanning direction D1 where the image of the document 9 is read is referred to as a main area A1 (see FIG. 5). The main area A1 is an area in the main scanning direction D1 where the document 9 on the platen glass portion 16*a* can be placed.

In addition, an area adjacent to one end of the main area A1 in the main scanning direction D1 is referred to as a reference area A2 (see FIG. 5). The reference area A2 is an area outside the main area A1 in the main scanning direction D1.

The first white reference portion 21 and the second white reference portion 22 are each formed across the main area A1 and the reference area A2 in the main scanning direction D1.

The area occupied by the platen glass portion 16*a* and the contact glass portion 16*b* in the main scanning direction D1 includes the main area A1 (see FIG. 5). The first reference portion 23*a*, the second reference portion 23*b*, the third reference portion 23*c*, the fourth reference portion 23*d* and the terminal reference portion 23*e* are arranged in the reference area A2 along the sub-scanning direction D2. As described above, the sub-scanning direction D2 is a direction along the first direction D21 and the second direction D22.

In the present embodiment, a part of the edge of the first opening 18*a* in the glass cover member 18 serves as the first reference portion 23*a* (see FIG. 5). The first reference portion 23*a* is formed along one end of the first opening 18*a* in the main scanning direction D1.

In addition, a part of the edge of the second opening 18*b* in the glass cover member 18 is the third reference portion 23*c* (see FIG. 5). The third reference portion 23*c* is formed along the end of the second opening 18*b* in the second direction D22.

Therefore, the lower surfaces of at least the first reference portion 23*a* and the third reference portion 23*c* of the glass cover member 18 are black. For example, the entire lower surface of the glass cover member 18 is a black surface.

The terminal reference portion 23*e* is arranged on the lower surface of the edge of the first opening 18*a* in the glass cover member 18 (see FIG. 6). For example, the terminal reference portion 23*e* is a sheet or plate of synthetic resin.

[Home Positioning Control]

Next, an example of a procedure for home positioning control will be described with reference to the flowchart shown in FIG. 7.

The home positioning control is executed in order to position the scanning unit 10 at the home position P1. The reading control portion 5*b* starts the home positioning control when the image reading apparatus 1 is started.

In the following description, S101, S102, . . . represent identification codes of a plurality of steps in the home positioning control. In the home positioning control, the reading control portion 5*b* first starts the process of step S101.

<Step S101>

In step S101, the reading control portion 5*b* executes a first offset setting process.

The first offset setting process includes a process of causing the first CIS unit 1*x* to execute a dark image reading process, a process of acquiring dark image data, and a process of setting a reference data offset value.

In the dark image reading process, the reading control portion 5*b* operates the image sensor 14 without causing the light emitting portion 11 to emit light. The dark image data is line image data Id0 obtained in a state where no light is emitted. When the reading control portion 5*b* causes the first CIS unit 1*x* to execute the dark image reading process, the reading control portion 5*b* acquires the dark image data from the first CIS unit 1*x*.

The reading control portion 5*b* sets the reference data offset value to be applied to the reference pixel data based on one or more reference pixel data in the dark image data.

The reference pixel data is one or more pixel data corresponding to the reference area A2 in the line image data Id0. The reference pixel data in step S101 is one or more pixel data corresponding to the reference area A2 in the dark image data.

The reference area A2 is an area corresponding to the first reference portion 23*a*, the second reference portion 23*b*, the third reference portion 23*c*, or the fourth reference portion 23*d* in the main scanning direction D1 (see FIG. 5).

For example, the reading control portion 5*b* sets the difference between a preset reference value and a representative value of the reference pixel data as the reference data offset value. For example, the representative value of the reference pixel data is the minimum value of one or more pixel values in the reference pixel data.

After executing the process of step S101, the reading control portion 5*b* executes the process of step S102.

<Step S102>

In step S102, the reading control portion 5*b* executes color determination control.

The color determination control includes causing the first CIS unit 1*x* to execute a line image reading process, and causing the image processing portion 5*c* to execute a reference data correction process and a color determination process.

In the line image reading process, the reading control portion 5*b* causes the light emitting portion 11 to emit light and also causes the image sensor 14 to operate. For example, in the line image reading process, the reading control portion 5*b* sequentially causes the red light emitting portion 11R, the green light emitting portion 11G, and the blue light emitting portion 11B to emit light one by one.

In the reference data correction process, the image processing portion 5*c* corrects the reference pixel data in the line image data Id0 obtained by the line image reading process with the reference data offset value.

Furthermore, in the color determination process, the image processing portion 5*c* determines whether the corrected reference pixel data is data for black, white, or any of the above specific colors.

Here, the corrected reference pixel data corresponding to the emitted light of the red light emitting portion 11R is referred to as red reference data, the corrected reference data corresponding to the emitted light of the green light emitting portion 11G is referred to as green reference data, and the corrected reference data corresponding to the emitted light of the blue light emitting portion 11B is referred to as blue reference data.

When the specific color is red, green, blue, yellow, magenta, or cyan, the image processing portion 5*c* executes a binarization process on the red reference data, the green reference data, and the blue reference data. Furthermore, the image processing portion 5*c* determines the color of the reference pixel data based on the three binarized values obtained by the binarization process.

For example, in a case in which the specific color is red, green, or blue, the image processing portion 5*c* determines that the reference pixel data is data of the specific color when only one of the three binary values corresponding to the specific color is a high value.

Furthermore, the image processing portion 5*c* determines that the reference pixel data is data of the color white when one of the three binarized values corresponding to one of the two colors other than the specific color is a High value.

Moreover, the image processing portion 5*c* determines that the reference pixel data is data of the color black when one of the three binarized values corresponding to one of the two colors other than the specific color is a Low value.

In the following description, two colors that constitute yellow, magenta, or cyan out of the three primary colors of red, green, and blue will be referred to as two constituent colors.

In a case in which the specific color is yellow, magenta, or cyan, the image processing portion 5*c* determines that the reference pixel data is data of the specific color in a case in which only two of the three binary values corresponding to the two constituent colors are High values.

Furthermore, the image processing portion 5*c* determines that the reference pixel data is white data when one of the three binarized values corresponding to a color other than the two constituent colors is a High value.

Moreover, the image processing portion 5*c* determines that the reference pixel data is data of the color black when one of the three binarized values corresponding to a color other than the two constituent colors is a Low value.

As described above, in a case in which the specific color is red, green, blue, yellow, magenta or cyan, the color determination process is achieved by the binarization process and the determination process of the three binarized values.

The reading control portion 5*b* executes the process of step S103 when the result of the color determination process is white. On the other hand, when the result of the color determination process is black or the specific color, the reading control portion 5*b* executes the process of step S111.

<Step S103>

In step S103, the reading control portion 5*b* causes the unit driving device 17 to execute an operation of moving the scanning unit 10 a first distance in the first direction D21. The first distance is an example of a first confirmation distance.

The first distance is a distance from the home position P1 to an area of the fourth reference portion 23*d* in the sub-scanning direction D2. For example, the first distance is a distance L1 from the home position P1 to a center line of the fourth reference portion 23*d* in the sub-scanning direction D2 (see FIG. 6).

Hereinafter, the operation of the unit driving device 17 in step S103 will be referred to as a first driving operation. After executing the process of step S103, the reading control portion 5*b* executes the process of step S104.

<Step S104>

In step S104, the reading control portion 5*b* executes the color determination control when the scanning unit 10 is stopped at the position reached by the first driving operation.

The reading control portion 5*b* executes the process of step S105 when the result of the color determination process is white, and executes the process of step S111 when the result of the color determination process is black.

Note that the reading control portion 5*b* executes the process of step S112 when the result of the color determination process is the specific color.

<Step S105>

In step S105, the reading control portion 5*b* causes the unit driving device 17 to execute an operation of moving the scanning unit 10 a second distance in the second direction D22.

The second distance is the distance from the area of the fourth reference portion 23*d* to the area of the first reference portion 23*a* in the sub-scanning direction D2. The second distance is greater than the first movement distance.

For example, the second distance is a distance L2 from the center line of the fourth reference portion 23*d* in the sub-scanning direction D2 to the end of the first reference portion 23*a* in the first direction D21 plus a small margin (see FIG. 6).

Hereinafter, the operation of the unit driving device 17 in step S105 will be referred to as a second driving operation. After executing the process of step S105, the reading control portion 5*b* executes the process of step S106.

When the image reading apparatus 1 is started, the scanning unit 10 is often located at the home position P1.

In a case in which the scanning unit 10 is at the home position P1 at the start of the home positioning control, the scanning unit 10 reaches a pre-adjustment position through the processes of steps S101 to S105. The pre-adjustment position is a position of the scanning unit 10 facing a portion of the first reference portion 23*a* near the end in the first direction D21.

Therefore, the scanning unit 10 is often moved to the pre-adjustment position in two movements.

<Step S106>

In step S106, the reading control portion 5*b* executes the color determination control when the scanning unit 10 is stopped at the position reached by the second driving operation.

The reading control portion 5*b* executes the process of step S107 when the result of the color determination process is black, and executes the process of step S111 when the result of the color determination process is white.

Note that the reading control portion 5*b* executes the process of step S112 when the result of the color determination process is the specific color.

In a case in which the scanning unit 10 is at the home position P1 when the home positioning control is started, the processes of steps S101 to S106 are executed.

<Step S107>

In step S107, the reading control portion 5*b* causes the unit driving device 17 to execute an operation of moving the scanning unit 10 a reference distance in the first direction D21.

The reference distance is shorter than the first distance and the second distance. The reference distance is set in advance according to the accuracy required for positioning the scanning unit 10 at the home position P1. Therefore, the reference distance is a very small distance.

Hereinafter, the operation of the unit driving device 17 in step S107 will be referred to as a third driving operation. After executing the process of step S107, the reading control portion 5*b* executes the process of step S108.

<Step S108>

In step S108, the reading control portion 5*b* executes the color determination control when the scanning unit 10 is stopped at the position reached by the third driving operation.

The reading control portion 5*b* executes the process of step S109 when the result of the color determination process is white, and executes the processes of steps S107 and S108 again when the result of the color determination process is black.

That is, the unit driving device 17 executes the third driving operation one or more times to move the scanning unit 10 in the first direction D21 by the reference distance until the reference pixel data is determined to be white data (see steps S107 and S108).

The scanning unit 10 moves to a position facing an end of the second reference portion 23*b* in the second direction D22 by one or more of the third driving operations.

Note that the reading control portion 5*b* executes the process of step S112 when the result of the color determination process is the specific color.

<Step S109>

In step S109, the reading control portion 5*b* causes the unit driving device 17 to execute an operation of moving the scanning unit 10 a third distance in the first direction D21.

The third distance is a distance L3 in the sub-scanning direction D2 from the end of the second reference portion 23*b* in the second direction D22 to the home position P1 (see FIG. 6). The third distance is shorter than the first distance and the second distance and longer than the reference distance.

Hereinafter, the operation of the unit driving device 17 in step S109 will be referred to as a completion driving operation. The completion driving operation is executed when it is determined that the reference pixel data is white data after the third driving operation is performed. The third distance is an example of a final adjustment distance.

The unit driving device 17 executes the completion driving operation to position the scanning unit 10 at the home position P1. Positioning error of the scanning unit 10 is approximately the reference distance. After executing the process of step S109, the reading control portion 5*b* executes the process of step S110.

<Step S110>

In step S110, the reading control portion 5*b* executes a second offset setting process. The process of step S110 is executed after the scanning unit 10 is positioned at the home position P1.

The second offset setting process includes a process of causing the first CIS unit 1*x* to execute the dark image reading process, a process of acquiring the dark image data, and a process of setting a main data offset value.

The process of causing the first CIS unit 1*x* to execute the dark image reading process and the process of acquiring the dark image data are similar to the process in step S101.

The reading control portion 5*b* sets the main data offset value to be applied to a plurality of main pixel data in the dark image data based on the plurality of main pixel data.

The plurality of main pixel data are a plurality of pixel data corresponding to the main area A1 in the line image data Id0.

For example, the reading control portion 5*b* sets a difference between a preset reference value and a representative value of the plurality of main pixel data as the main data offset value. For example, the representative value of the main pixel data is the minimum value or the average value of the plurality of pixel values in the plurality of main pixel data.

After executing the process of step S110, the reading control portion 5*b* ends the home positioning control.

After the process of step S110 has been executed, the reading control portion 5*b* corrects the plurality of main pixel data in the line image data Id0 obtained when the stationary document reading process is executed, using the main data offset value.

Furthermore, the reading control portion 5*b* also corrects the plurality of main pixel data in the line image data Id0 obtained when the conveyed document reading process is executed, using the main data offset value.

Note that the line image data Id0 obtained when the stationary document reading process and the conveyed document reading process are each executed is line image data Id0 obtained in a state where the light emitting unit 11 is made to emit light.

<Step S111>

In step S111, the reading control portion 5*b* executes a pre-adjustment control, which will be described later. The pre-adjustment control is a process for moving the scanning unit 10 to the pre-adjustment position.

After executing the pre-adjustment control, the reading control portion 5*b* executes the processes of steps S107 to S110.

Through the processes of steps S101 to S106 or the process of step S111, the scanning unit 10 reaches the pre-adjustment position before the third driving operation of step S107 is started. The pre-adjustment position is a position close to a boundary between the first reference portion 23*a* and the second reference portion 23*b*.

Therefore, the unit driving device 17 can position the scanning unit 10 at the home position P1 simply by executing the third driving operation a relatively small number of times and executing the completion driving operation once.

<Step S112>

In step S112, the reading control portion 5*b* executes a predetermined error process. For example, the error process includes a process of outputting an error message to the display device 3*b*.

After executing the process of step S112, the reading control portion 5*b* forcibly ends the home positioning control. In this case, the positioning of the scanning unit 10 is terminated without being completed.

[Pre-adjustment Control]

Next, an example of a procedure of the pre-adjustment control will be described with reference to the flowchart shown in FIG. 8.

In the following description, S201, S202, . . . represent identification codes of a plurality of steps in the pre-adjustment control.

In the pre-adjustment control, in a case in which the discrimination result of the immediately preceding color determination control is white or black, the reading control portion 5*b* first executes the process of step S201. On the other hand, in the pre-adjustment control, in a case in which the determination result of the immediately preceding color determination control is the specific color, the reading control portion 5*b* first executes the process of step S207.

Figure 7:
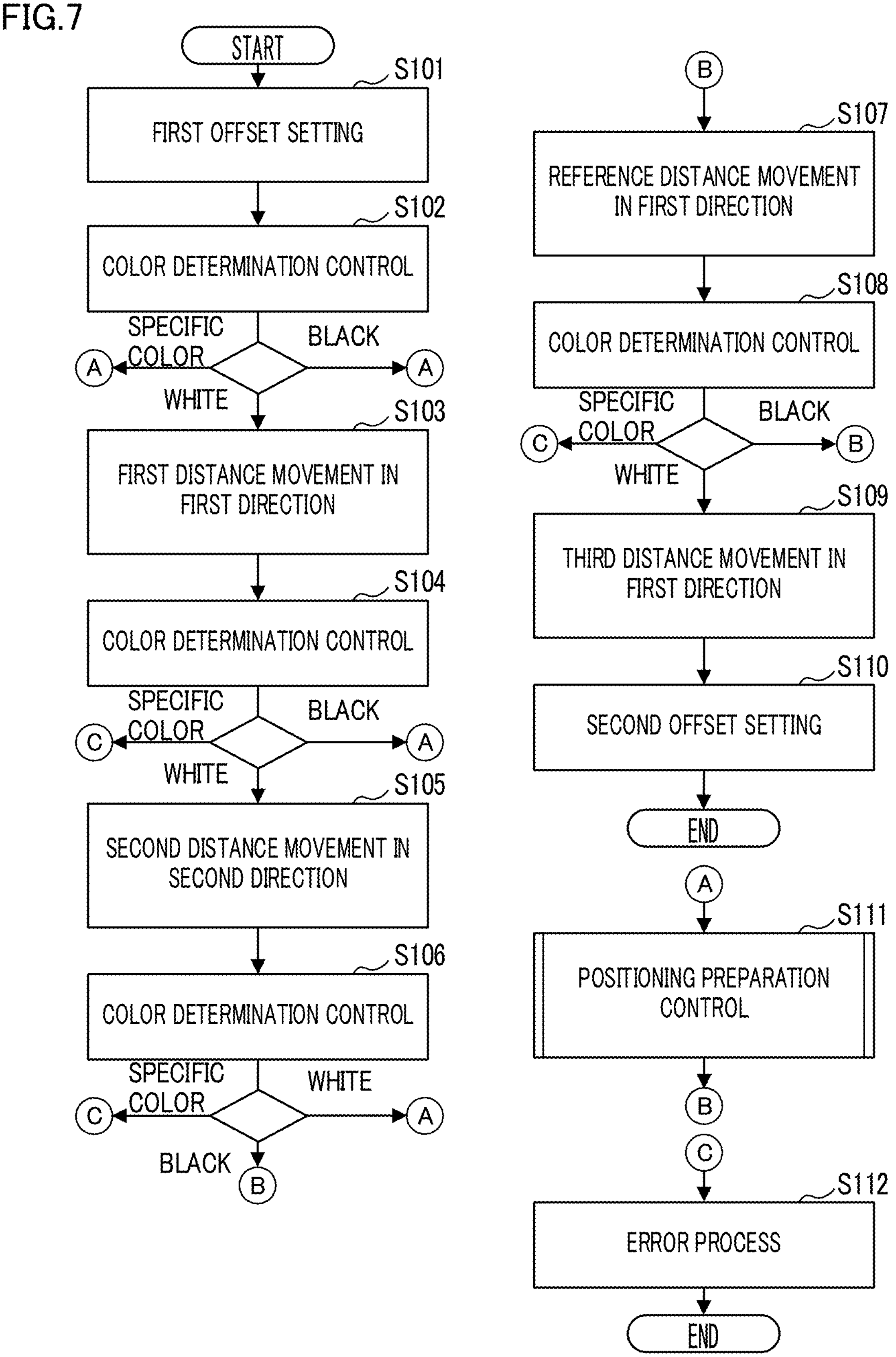
FIG. 7 is a flowchart showing an example of a procedure of home positioning control in the image reading apparatus according to the first embodiment.

The immediately preceding color determination control is the process of step S102, step S104 or step S106 (see FIG. 7).

<Step S201>

In step S201, the reading control portion 5*b* causes the unit driving device 17 to execute an operation of moving the scanning unit 10 a fourth distance in the second direction D22.

The fourth distance is a distance that is set so that the scanning unit 10 reliably moves to a position facing the first reference portion 23*a* regardless of the position before the movement. The fourth distance is longer than a distance L4 from an end of the movable area in the first direction D21 to an end of the first reference portion 23*a* in the first direction D21 (see FIG. 6).

The fourth distance is equal to or less than the length of the terminal reference portion 23*e* in the sub-scanning direction D2.

Hereinafter, the operation of the unit driving device 17 in step S201 will be referred to as a fourth driving operation. After executing the process of step S201, the reading control portion 5*b* executes the process of step S202.

<Step S202>

In step S202, the reading control portion 5*b* executes the color determination control when the scanning unit 10 is stopped at the position reached by the fourth driving operation.

The reading control portion 5*b* executes the process of step S203 when the result of the color determination process is black, and executes the process of step S208 when the result of the color determination process is white.

In addition, the reading control portion 5*b* executes the process of step S207 when the result of the color determination process is the specific color.

<Step S203>

In step S203, the reading control portion 5*b* causes the unit driving device 17 to execute an operation of moving the scanning unit 10 a fifth distance in the first direction D21.

The fifth distance is shorter than a width of the second reference portion 23*b* in the sub-scanning direction D2 and longer than the reference distance.

Hereinafter, the operation of the unit driving device 17 in step S203 will be referred to as a fifth driving operation. After executing the process of step S203, the reading control portion 5*b* executes the process of step S204.

The process of step S204 may be executed following a seventh driving operation of step S207, which will be described later.

<Step S204>

In step S204, the reading control portion 5*b* executes the color determination control when the scanning unit 10 is stopped at a position reached by the fifth driving operation or the seventh driving operation.

The reading control portion 5*b* executes the process of step S205 when the result of the color determination process is white, and executes the processes of steps S203 and S204 again when the result of the color determination process is black.

Note that the reading control portion 5*b* executes the process of step S208 when the result of the color determination process is the specific color.

<Step S205>

In step S205, the reading control portion 5*b* causes the unit driving device 17 to execute an operation of moving the scanning unit 10 by the fifth distance in the second direction D22.

Hereinafter, the operation of the unit driving device 17 in step S205 will be referred to as a sixth driving operation. After executing the process of step S205, the reading control portion 5*b* executes the process of step S206.

When the unit driving device 17 executes the sixth driving operation, the scanning unit 10 moves to a position facing a portion of the first reference portion 23*a* closer to the end in the first direction D21.

<Step S206>

In step S206, the reading control portion 5*b* executes the color determination control when the scanning unit 10 is stopped at the position reached by the sixth driving operation.

In a case in which the result of the color determination process is black, the reading control portion 5*b* ends the pre-adjustment control, and executes the processes from step S107 onward (see FIG. 7). The reading control portion 5*b* executes the process of step S208 when the result of the color determination process is white or the specific color.

<Step S207>

In step S207, the reading control portion 5*b* causes the unit driving device 17 to execute an operation of moving the scanning unit 10 a sixth distance in the first direction D21. The sixth distance is greater than the fourth distance.

For example, the sixth distance is a distance slightly shorter than the distance from the end of the terminal reference portion 23*e* in the first direction D21 to the end of the first reference portion 23*a* in the first direction D21.

The operation of the unit driving device 17 in step S207 is the seventh driving operation. After executing the process of step S207, the reading control portion 5*b* executes the process of step S204.

<Step S208>

In step S208, the reading control portion 5*b* executes a predetermined error process. For example, the error process includes a process of outputting an error message to the display device 3*b*.

After executing the process of step S207, the reading control portion 5*b* forcibly ends the home positioning control. Thus, the processes after step S107 are not executed, and the positioning of the scanning unit 10 ends without being completed (see FIG. 7).

The first driving operation in step S103, the second driving operation in step S105, the third driving operation in step S107, and the completion driving operation in step S109 are examples of a plurality of trial driving operations. Furthermore, the fourth driving operation in step S201, the fifth driving operation in step S203, the sixth driving operation in step S205, and the seventh driving operation in step S207 are also examples of the plurality of trial driving operations.

The plurality of trial drive operations are a plurality of operations of the unit drive device 17 that move the scanning unit 10 in different directions or by different distances.

In the home positioning control, the unit driving device 17 executes a plurality of driving operations that are sequentially selected from the plurality of trial driving operations according to the determination result of the color determination process (see steps S102 to S111 and steps S201 to S207). Thus, the unit driving device 17 positions the scanning unit 10 at the home position P1.

The home position P1 is a position on the first direction D21 side of the platen glass portion 16*a*. In the present embodiment, the home position P1 is a position between the platen glass portion 16*a* and the contact glass portion 16*b* in the sub-scanning direction D2.

In the present embodiment, the unit driving device 17 executes the first driving operation when it is determined that the reference pixel data is white data (see steps S102 and S103). The first driving operation is an example of a first confirmation operation. The first distance in the first driving operation is an example of a first confirmation distance.

Furthermore, the unit driving device 17 executes the second driving operation when it is determined that the reference pixel data is white data after the first driving operation has been performed (see steps S104 and S105). The second driving operation is an example of a second confirmation operation. The second distance in the second driving operation is an example of a second confirmation distance.

In a case in which the scanning unit 10 is at the home position P1 at the start of the home positioning control, the scanning unit 10 moves to the pre-adjustment position by the first driving operation and the second driving operation.

The unit driving device 17 executes the fourth driving operation when it is determined that the reference pixel data is black data (see steps S102, S111, and S201). The fourth driving operation is an example of a first pre-adjustment operation. The fourth distance in the fourth driving operation is an example of a first pre-adjustment distance.

In a case in which the scanning unit 10 is at a position facing none of the second reference portion 23*b*, the fourth reference portion 23*d* and the terminal reference portion 23*e* at the start of the home positioning control, the fourth driving operation is executed.

In a case in which the scanning unit 10 is located at a position farther away from the terminal reference portion 23*e* in the first direction D21 than the fourth distance at the start of the home positioning control, the scanning unit 10 moves to a position facing the first reference portion 23*a* by the fourth driving movement.

The unit driving device 17 executes the seventh driving operation when it is determined that the reference pixel data is data of the specific color (see steps S102, S111, and S207). The seventh driving operation is an example of a second pre-adjustment operation. The sixth distance in the seventh driving operation is an example of a second pre-adjustment distance that is longer than the first pre-adjustment distance.

By determining the specific color and executing the seventh driving operation, the scanning unit 10 is prevented from colliding with one end of the movable area.

In a case in which the scanning unit 10 is located at a position opposite the terminal reference portion 23*e* at the start of the home positioning control, the scanning unit 10 moves to a position facing a portion of the first reference portion 23*a* closer to the second reference portion 23*b* by the seventh driving operation.

In a case in which the scanning unit 10 is located closer to the terminal reference portion 23*e* than the fourth distance in the first direction D21 at the start of the home positioning control, the scanning unit 10 moves to a position facing a portion of the first reference portion 23*a* closer to the second reference portion 23*b* by the fourth driving movement and the seventh driving movement.

When the reference pixel data is determined to be black data after the fourth driving operation or the seventh driving operation is performed, the unit driving device 17 executes the fifth driving operation one or more times until the reference pixel data is determined to be white data (see steps S203 and S204).

The fifth driving operation is an example of a first rough adjustment operation. The fifth distance in the fifth driving operation is an example of a rough adjustment distance that is shorter than the first pre-adjustment distance. By performing the fifth driving operation one or more times, the scanning unit 10 moves to a position facing the second reference portion 23*b*.

When it is determined that the reference pixel data is white data after the fifth driving operation or the seventh driving operation has been performed, the unit driving device 17 executes the sixth driving operation (see steps S204 and S205).

The sixth driving operation is an example of a second rough adjustment operation. The scanning unit 10 moves to the pre-adjustment position by the sixth driving operation.

When it is determined that the reference pixel data is black data after the second driving operation in step S105 or the sixth driving operation in step S205 has been performed, the unit driving device 17 executes the processes of steps S107 to S108.

In steps S107 and S108, the unit driving device 17 executes the third driving operation one or more times until it is determined that the reference pixel data is white data.

The third driving operation is an example of a fine adjustment operation. The reference distance in the third driving operation is an example of a fine adjustment distance that is shorter than the rough adjustment distance.

When it is determined that the reference pixel data is white data after the third driving operation has been performed, the unit driving device 17 executes the completion driving operation (see steps S108 and S109). By executing the completion driving operation, the scanning unit 10 is positioned at the home position P1.

By employing the image reading apparatus 1, it is possible to quickly position the scanning unit 10 at the home position P1 without causing the scanning unit 10 to collide with one end of the movable area.

In addition, before the color determination control is executed, the reference data offset value is set based on the dark image data. Furthermore, the reference pixel data corrected by the reference data offset value is used in the color determination process (see steps S101, S102, S104 and S106).

The color determination process in each of steps S101, S102, S104, and S106 is an example of a process for determining which of a plurality of determination colors the corrected reference pixel data belongs to. In the present embodiment, the plurality of determination colors are white, black, and the specific color.

Therefore, the variation in the value of the dark image data caused by the variation in the characteristics of the first CIS unit 1*x* is corrected by the reference data offset value.

In the present embodiment, the pixel value of the specific color data is a value between the pixel value of the white data and the pixel value of the black data. Therefore, the variation in the characteristics of the first CIS unit 1*x* is likely to adversely affect the determination of the specific color.

By employing the image reading apparatus 1, the variation in the value of the dark image data is corrected by the reference data offset value, and thus errors in determining the plurality of determination colors are unlikely to occur. As a result, the first CIS unit 1*x* is reliably positioned at the home position P1.

Second Embodiment

Next, an image reading apparatus 1A according to a second embodiment will be described with reference to FIGS. 9 to 11. The following describes the differences between the image reading apparatus 1A and the image reading apparatus 1.

[Configuration of Image Reading Apparatus 1A]

Figure 10:
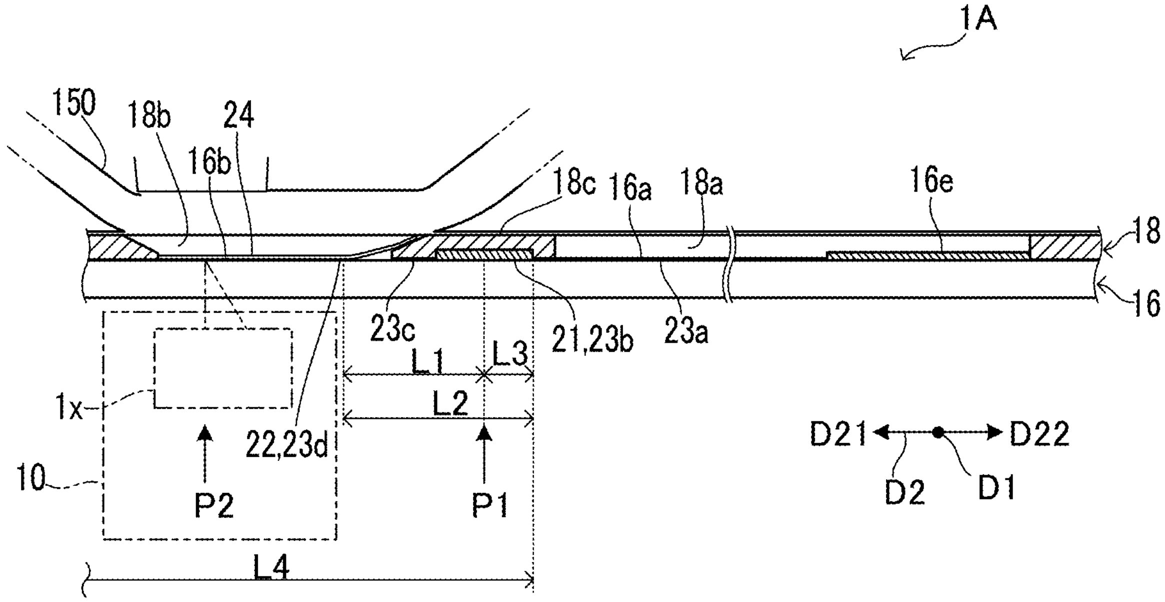
FIG. 10 is a cross-sectional view of an upper portion of the main body of the image reading apparatus according to the second embodiment.

The image reading apparatus 1A has a configuration in which the fourth reference portion 23*d* is removed from the image reading apparatus 1 (see FIG. 10).

Figure 9:
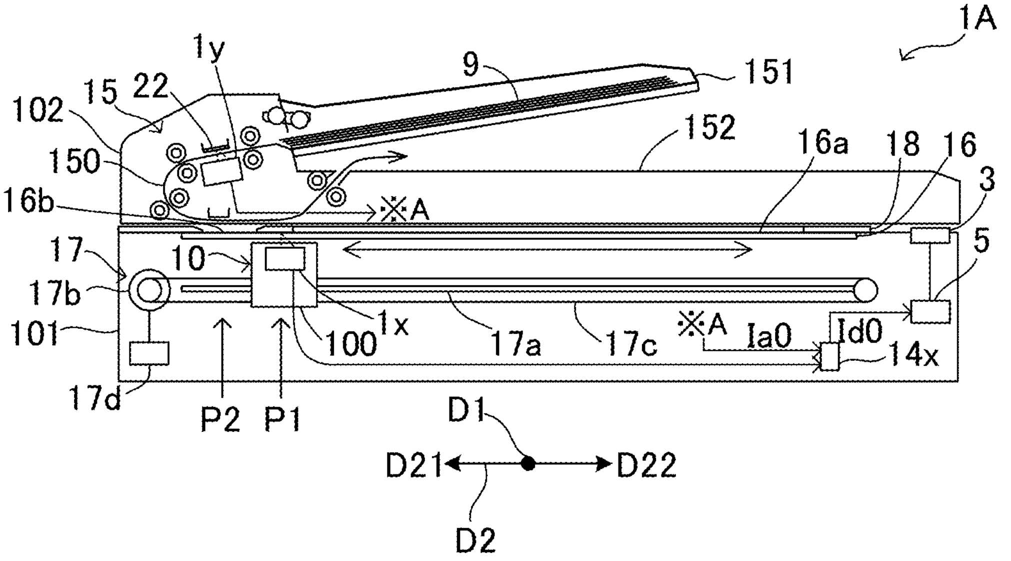
FIG. 9 is a diagram showing a configuration of an image reading apparatus according to a second embodiment.

For example, the image reading apparatus 1A has a configuration in which the second CIS unit 1*y* and the second white reference unit 22 are arranged at different positions compared to the image reading apparatus 1 (see FIG. 9).

In the example shown in FIG. 9, the second CIS unit 1*y* is arranged facing a part of the conveying path 150 from below. The second white reference unit 22 is arranged facing the second CIS unit 1*y* across the conveying path 150.

In the image reading apparatus 1A, the second white reference portion 22 does not have the fourth reference portion 23*d* located in a reference area A2.

In the image reading apparatus 1A, the first white reference portion 21 is arranged on the lower surface of a portion of the glass cover member 18 on the first direction D21 side with respect to the first opening 18*a* (see FIG. 10).

[Home Positioning Control]

Figure 11:
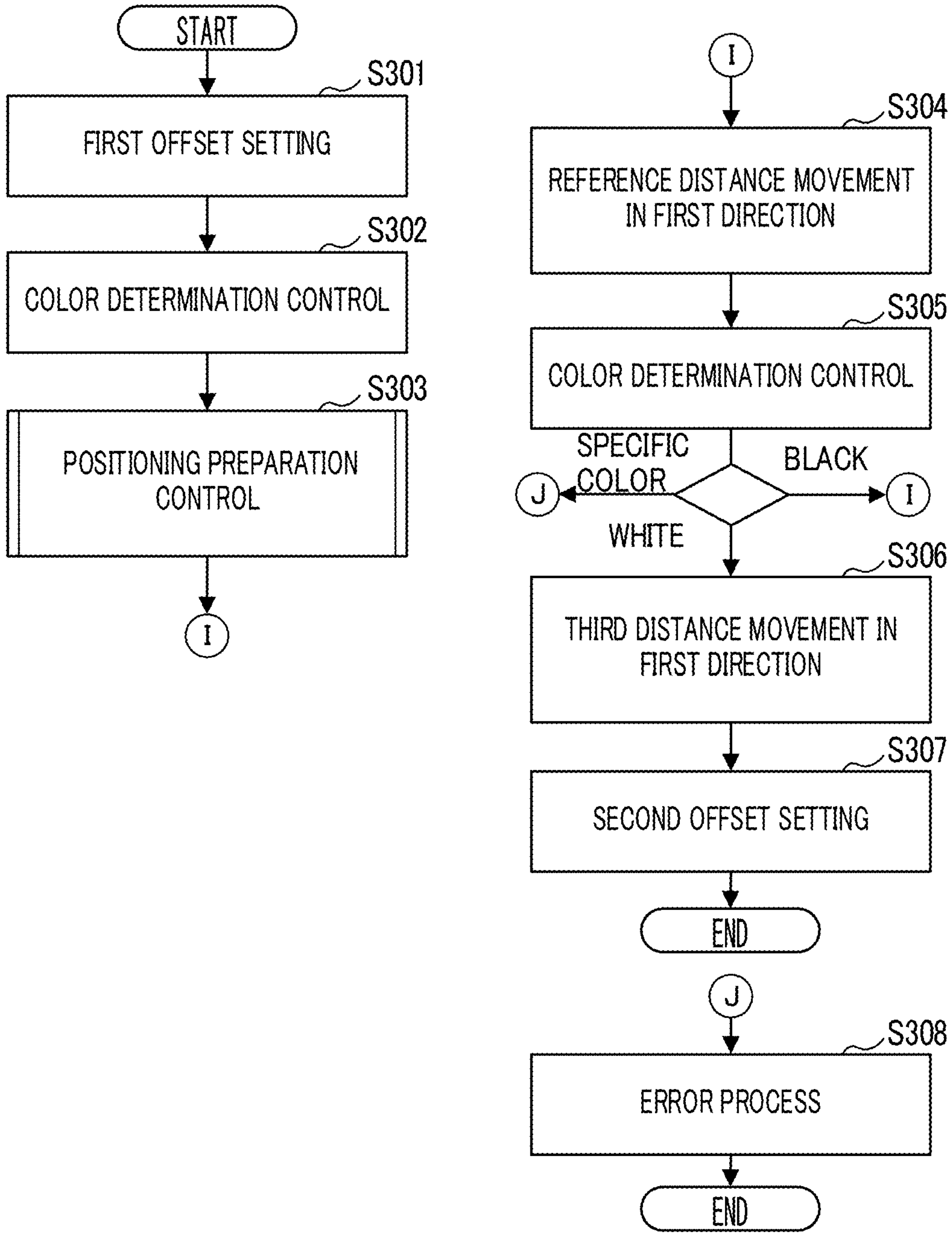
FIG. 11 is a flowchart showing an example of a procedure of home positioning control in the image reading apparatus according to the second embodiment.

In the present embodiment, the reading control portion 5*b* executes the home positioning control shown in FIG. 11, for example, instead of the home positioning control shown in FIG. 7. The reading control portion 5*b* starts the home positioning control when the image reading apparatus 1A is started.

In the following description, S301, S302, . . . represent identification codes of a plurality of steps in the home positioning control by the image reading apparatus 1A. In the home positioning control, the reading control portion 5*b* first starts the process of step S301.

<Step S301>

In step S301, the reading control portion 5*b* executes a first offset setting process. Step S301 corresponds to step S101 in FIG. 7.

By the process of step S301, the reference data offset value is set based on the dark image data.

After executing the process of step S301, the reading control portion 5*b* executes the process of step S302.

<Step S302>

In step S302, the reading control portion 5*b* executes the color determination control. Step S302 corresponds to step S102 in FIG. 7.

In the present embodiment as well, the reading control portion 5*b* corrects the reference pixel data in the line image data Id0 with the reference data offset value set in step S301. Furthermore, the reading control portion 5*b* executes the color determination process using the reference pixel data after correction.

After executing the process of step S302, the reading control portion 5*b* executes the process of step S303. The result of the color determination process in step S302 is reflected in the process in step S303.

<Step S303>

Figure 8:
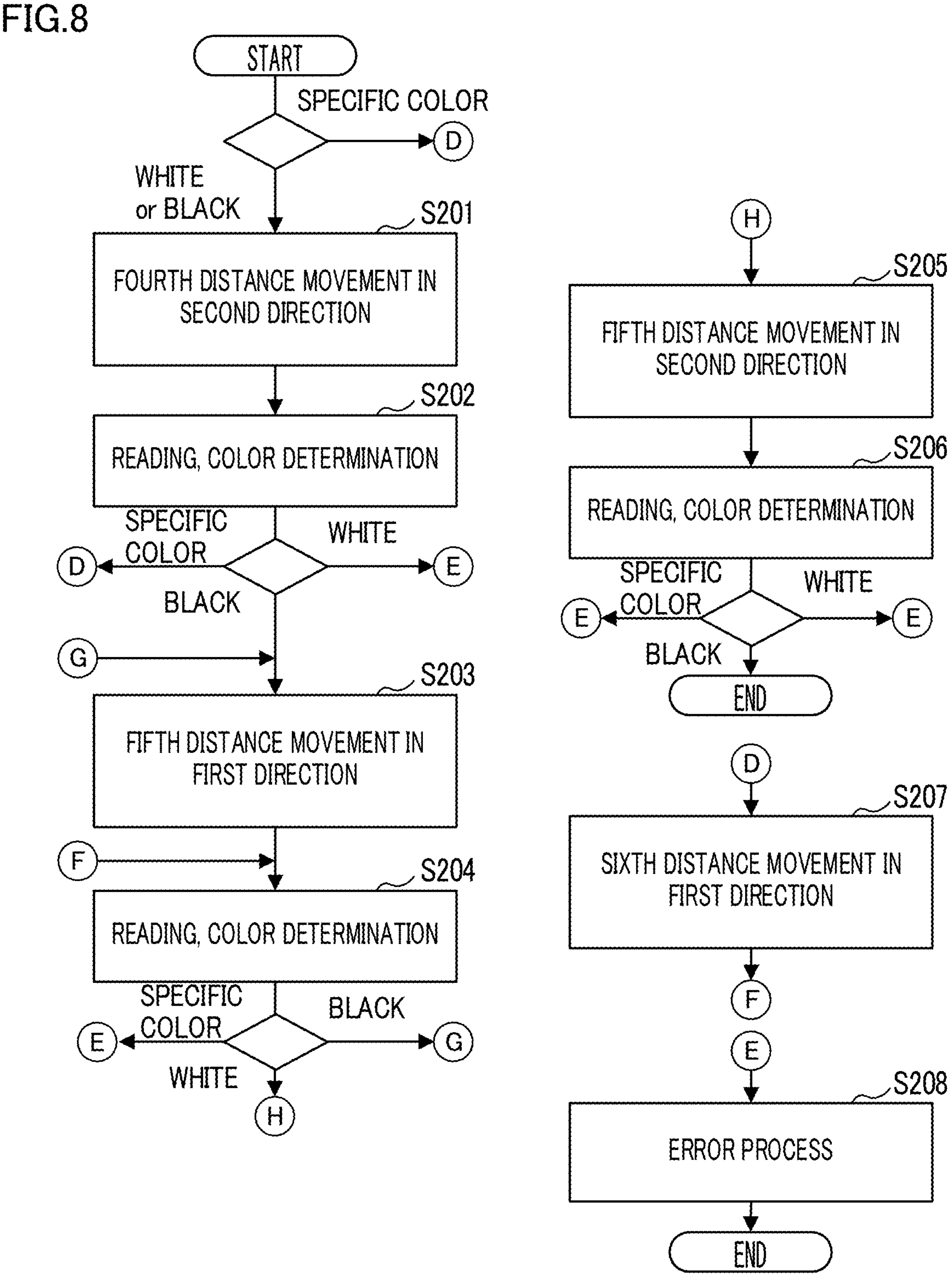
FIG. 8 is a flowchart showing an example of a procedure of pre-adjustment control in the image reading apparatus according to the first embodiment.

In step S303, the reading control portion 5*b* executes the pre-adjustment control (see FIG. 8). The pre-adjustment control is a process for moving the scanning unit 10 to the pre-adjustment position.

The result of the color determination process in step S302 is reflected in the selection of the first process in the pre-adjustment control (see FIG. 8).

That is, in a case in which it is determined in step S302 that the reference pixel data is not data of the specific color, the reading control portion 5*b* executes the processes starting from step S201 (see FIG. 8).

On the other hand, in a case in which it is determined in step S302 that the reference pixel data is data of the specific color, the reading control portion 5*b* executes the process of step S207 (see FIG. 8).

After executing the pre-adjustment control, the reading control portion 5*b* executes the processes of steps S304 to S306.

<Steps S304 to S306>

In steps S304 to S307, the reading control portion 5*b* executes the same processes as those in steps S107 to S110 in FIG. 7.

Note that in the step S305 corresponding to the step S108, in a case in which it is determined that the reference pixel data is data of the specific color, the reading control portion 5*b* executes the process of step S308.

<Step S308>

In step S308, the reading control portion 5*b* executes the error process in the same manner as in step S112 of FIG. 7.

After executing the process of step S308, the reading control portion 5*b* forcibly ends the home positioning control. In this case, the positioning of the scanning unit 10 is terminated without being completed.

In the present embodiment, the unit driving device 17 executes the fourth driving operation when it is determined that the reference pixel data is not data of the specific color (see steps S302, S303, and S201). The fourth driving operation is an example of the first pre-adjustment operation.

The unit driving device 17 executes the seventh driving operation when it is determined that the reference pixel data is data of the specific color (see steps S302, S303, and S207). The seventh driving operation is an example of the second pre-adjustment operation.

When the reference pixel data is determined to be black data after the fourth driving operation or the seventh driving operation is performed, the unit driving device 17 executes the fifth driving operation one or more times until the reference pixel data is determined to be white data (see steps S203 and S204). The fifth driving operation is an example of the first rough adjustment operation.

When it is determined that the reference pixel data is white data after the fifth driving operation or the seventh driving operation has been performed, the unit driving device 17 executes the sixth driving operation (see steps S204 and S205). The sixth driving operation is an example of the second rough adjustment operation.

When it is determined that the reference pixel data is black data after the sixth driving operation of step S205 or the seventh driving operation of step S207 has been performed, the unit driving device 17 executes the processing of steps S304 to S305 (see FIG. 11).

In steps S304 and S305, the unit driving device 17 executes the third driving operation one or more times until it is determined that the reference pixel data is white data. The third driving operation is an example of the fine adjustment operation.

When it is determined that the reference pixel data is white data after the third driving operation has been performed, the unit driving device 17 executes the completion driving operation (see steps S305 and S306). By executing the completion driving operation, the scanning unit 10 is positioned at the home position P1.

In a case in which the image reading apparatus 1A is employed, the same effects as in a case in which the image reading apparatus 1 is employed can be obtained.

[First Application Example]

Hereinafter, a first application example of the image reading apparatus 1 or the image reading apparatus 1A will be described with reference to FIG. 12.

Figure 12:
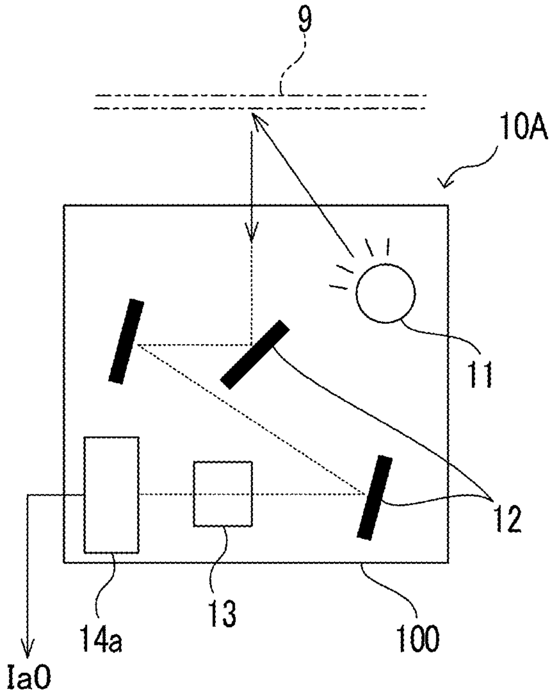
FIG. 12 is a configuration diagram of a scanning unit of an application example of the image reading apparatus according to the first embodiment.

The image reading apparatus according to the first application example has a configuration in which the scanning unit 10 of the image reading apparatus 1 or the image reading apparatus 1A is replaced with a scanning unit 10A shown in FIG. 12.

The scanning unit 10A includes a light emitting portion 11, one or more mirrors 12, a lens 13, an image sensor 14*a*, and a carriage 100. The carriage 100 supports the light emitting portion 11, the mirror 12, the lens 13 and the image sensor 14*a*.

The mirror 12 and the lens 13 are an example of a light guiding member that guides the reflected light to the image sensor 14*a*. The image sensor 14*a* is a Charge Coupled Device (CCD) type line sensor.

Similar to the image sensor 14, the image sensor 14*a* receives the light guided by the light guiding member and outputs a line image signal la0 that indicates the amount of received light. Even in a case in which this application example is employed, the same effects as when the image reading apparatus 1 or the image reading apparatus 1A is employed can be obtained.

[Second Application Example]

Next, a second application example of the image reading apparatus 1 or the image reading apparatus 1A will be described. The present application example is an application example of the first application example.

In the present application example, the carriage 100 is divided into a first carriage and a second carriage that move at different speeds. The first carriage supports the light emitting portion 11 and part of the plurality of mirrors 12, and the second carriage supports the remaining part of the plurality of mirrors 12.

In addition, the lens 13 and the image sensor 14*a* are fixed within the main body 101.

The mirrors 12 supported by the first carriage guide the light reflected by the document 9 to the mirrors 12 supported by the second carriage, and the mirrors 12 supported by the second carriage guide the light to the lens 13 and image sensor 14*a* fixed within the main body 101. In a case in which this application example is employed, the same effects as in a case in which the first application example is employed can be obtained.

[Third Application Example]

Next, a third application example of the image reading apparatus 1 will be described.

In the present application example, the colors of the lower surfaces of the first reference portion 23*a*, the second reference portion 23*b*, the third reference portion 23*c*, and the fourth reference portion 23*d* are reversed between black and white compared to the image reading apparatus 1. That is, in the present application example, the first color is white, and the second color is black.

In the present application example, the reading control portion 5*b* executes the processes shown in FIGS. 7 and 8 by interchanging black and white. In a case in which the present application example is employed, the same effects as in the case in which the image reading apparatus 1 is employed can be obtained.

[Fourth Application Example]

Next, a fourth application example of the image reading apparatus 1 will be described.

In the present application example, the first white reference portion 21 and the second reference portion 23*b* are arranged in a reverse manner to the arrangement of the first white reference portion 21 and the second reference portion 23*b* in the image reading apparatus 1.

In the present application example, the second white reference portion 22 includes a second reference portion 23*b*. That is, in the present application example, one end of the second white reference portion 22 in the main scanning direction D1 is the second reference portion 23*b*.

In the present application example, the first white reference portion 21 includes a fourth reference portion 23*d*. That is, in the present application example, one end of the first white reference portion 21 in the main scanning direction D1 is the fourth reference portion 23*d*.

In a case in which the present application example is employed, the same effects as in the case in which the image reading apparatus 1 is employed can be obtained.

[Fifth Application Example]

Next, a fifth application example of the image reading apparatus 1A will be described.

In the present application example, the colors of the lower surfaces of the first reference portion 23*a*, the second reference portion 23*b*, and the third reference portion 23*c* are reversed between black and white as compared to the image reading apparatus 1A. That is, in the present application example, the first color is white, and the second color is black.

In the present application example, the reading control portion 5*b* executes the processes shown in FIG. 11 and FIG. 8 by interchanging black and white. Even in a case in which the present application example is employed, the same effects as in a case in which the image reading apparatus 1A is employed can be obtained.

[Supplementary Notes of the Invention]

Hereinafter, an outline of the invention extracted from the above-described embodiments will be added. Note that the configurations and processing functions described in the following supplementary notes may be selected and combined as desired.

<Supplementary Note 1>

An image reading apparatus, comprising:

a transparent platen plate portion on which a document is placed;

a scanning unit including a light emitting portion and a light guiding portion, each of which is arranged along a main scanning direction, and configured to be movable in a first direction intersecting the main scanning direction and a second direction opposite to the first direction in a movable area including an area below the platen plate portion;

a main image sensor configured to receive light guided by the light guiding portion and output a line image signal representing an amount of received light;

a unit driving device configured to move the scanning unit in the first direction or the second direction within the movable area;

a control portion configured to control the main image sensor and the unit drive device and process line image data including a plurality of pixel data corresponding to the line image signal output by the main image sensor; and a plurality of reference portions arranged along the first direction in a reference area outside a main area on the platen plate portion in the main scanning direction in which the document can be placed, each of the reference portions having a lower surface of one of a plurality of predetermined reference colors; wherein the control portion sets a reference data offset value based on one or more reference pixel data of the reference area in the line image data obtained in a state where the light emitting portion is not caused to emit light;

the control portion further executes a color determination process to correct the reference pixel data in the line image data obtained in a state where the light emitting portion is caused to emit light with the reference data offset value, and to determine which of the plurality of determination colors the corrected reference pixel data is data of; and the control portion even further positions the scanning unit at a home position on the first direction side relative to the platen plate portion by causing the unit driving device to execute a plurality of driving operations that are sequentially selected from a plurality of trial driving operations that each differ in direction or distance by which the scanning unit is moved according to the determination result of the color determination process.

<Supplementary Note 2>

The image reading apparatus according to supplementary note 1, wherein the control portion sets a main data offset value based on a plurality of main pixel data of the main area in the line image data obtained in a state in which the light emitting portion is not caused to emit light after the scanning unit is positioned at the home position; and when a document reading process is executed to read an image of the document on the platen plate portion, the control portion further corrects the plurality of main pixel data in the line image data obtained in a state where the light emitting portion is caused to emit light with the main data offset value.

<Supplementary Note 3>

The image reading apparatus according to supplementary note 1 or supplementary note 2; wherein the plurality of determination colors include a first color, a second color, and a third color; and the plurality of reference portions include a first reference portion arranged along a side edge that forms one end of the platen plate portion in the main scanning direction and having a lower surface of the first color;

a second reference portion arranged adjacent to the first reference portion in the first direction and having a lower surface of the second color; and a terminal reference portion arranged adjacent to the first reference portion in the second direction in an area at an end of the movable area in the second direction, and having a lower surface of the third color.

<Supplementary Note 4>

The image reading apparatus according to supplementary note 3, wherein the first color is black;

the second color is white; and the third color is red, green, blue, yellow, magenta, or cyan.

<Supplementary Note 5>

The image reading apparatus according to supplementary note 3, including a white reference portion arranged along the main scanning direction on the first direction side of the platen plate portion and having a white lower surface; wherein the second color is white; and the white reference portion includes the second reference portion.

<Supplementary Note 6>

The image reading apparatus according to any one of supplementary notes 3 to 5, wherein the plurality of trial driving operations include:

a first pre-adjustment operation in which, when it is determined that the reference pixel data is not data of the third color, the unit driving device moves the scanning unit in the second direction by a first pre-adjustment distance;

a second pre-adjustment operation in which, when the reference pixel data is determined to be the third color, the unit driving device moves the scanning unit in the first direction by a second pre-adjustment distance that is longer than the first pre-adjustment distance;

a rough adjustment operation in which, when the reference pixel data is determined to be the first color data after the first pre-adjustment operation or the second pre-adjustment operation is performed, the unit driving device moves the scanning unit one or more times in the first direction by a rough adjustment distance shorter than the first pre-adjustment distance until the reference pixel data is determined to be the second color data;

a second rough adjustment operation in which, when the reference pixel data is determined to be the second color data after the first rough adjustment operation or the second pre-adjustment operation is performed, the unit driving device moves the scanning unit in the second direction by the rough adjustment distance;

a fine adjustment operation in which, when the reference pixel data is determined to be the first color data after the second rough adjustment operation is performed, the unit driving device moves the scanning unit one or more times in the first direction by a reference distance shorter than the rough adjustment distance until the reference pixel data is determined to be the second color data; and a completion driving operation in which, when it is determined that the reference pixel data is the second color data after the fine adjustment operation is performed, the unit driving device moves the scanning unit in the first direction by a final adjustment distance to position the scanning unit at the home position.

<Supplementary Note 7>

The image reading apparatus according to any one of supplementary notes 3 to 5, including a transparent contact plate portion arranged on the first direction side of the platen plate portion; and a document conveying configured to convey the document along a conveying path via an upper surface of the contact plate portion; wherein the plurality of reference portions include a third reference portion arranged adjacent to the second reference portion in the first direction and having a lower surface of the first color; and a fourth reference portion arranged adjacent to the third reference portion in the first direction and having a lower surface of the second color; wherein the home position is a position between the platen plate portion and the contact plate portion.

<Supplementary Note 8>

The image reading apparatus according to supplementary note 7, further including a first white reference portion arranged along the main scanning direction in an area between the platen plate portion and the contact plate portion in a sub-scanning direction that is along the first direction and the second direction, and having a white lower surface;

a second white reference portion arranged along the main scanning direction in an area between the platen plate portion and the contact plate portion in the sub-scanning direction and having a white upper surface; and a sub-image sensor arranged facing the upper surface of the second white reference portion and configured to read an image of an upper surface of the document conveyed by the document conveying device; wherein the second color is white;

one of the first white reference portion and the second white reference portion includes the second reference portion; and the other of the first white reference portion and the second white reference portion includes the fourth reference portion.

<Supplementary Note 9>

The image reading apparatus according to supplementary note 1 or supplementary note 8; wherein the plurality of trial driving operations include:

a first confirmation operation in which, when the reference pixel data is determined to be the second color data, the unit driving device moves the scanning unit in the first direction by a first confirmation distance;

a second confirmation operation in which, when it is determined that the reference pixel data is the second color data after the first confirmation operation is performed, the unit driving device moves the scanning unit in the second direction by a second confirmation distance;

a first pre-adjustment operation in which, when it is determined that the reference pixel data is not third color data, the unit driving device moves the scanning unit in the second direction by a first pre-adjustment distance;

a second pre-adjustment operation in which, when the reference pixel data is determined to be the third color, the unit driving device moves the scanning unit in the first direction by a second pre-adjustment distance that is longer than the first pre-adjustment distance;

a rough adjustment operation in which, when the reference pixel data is determined to be the first color data after the first pre-adjustment operation or the second pre-adjustment operation is performed, the unit driving device moves the scanning unit one or more times in the first direction by a rough adjustment distance shorter than the first pre-adjustment distance until the reference pixel data is determined to be the second color data;

a second rough adjustment operation in which, when the reference pixel data is determined to be the second color data after the first rough adjustment operation or the second pre-adjustment operation is performed, the unit driving device moves the scanning unit in the second direction by the rough adjustment distance;

a fine adjustment operation in which, when the reference pixel data is determined to be the first color data after the second confirmation operation or the second rough adjustment operation is performed, the unit driving device moves the scanning unit one or more times in the first direction by a reference distance shorter than the rough adjustment distance until the reference pixel data is determined to be the second color data; and a completion driving operation in which, when it is determined that the reference pixel data is the second color data after the fine adjustment operation is performed, the unit driving device moves the scanning unit in the first direction by a final adjustment distance to position the scanning unit at the home position.

<Supplementary Note 10>

The image reading apparatus according to any one of supplementary notes 1 to 9, wherein the scanning unit includes a contact image sensor unit having the light emitting portion, the light guiding portion that is a condensing lens, and the main image sensor of a CMOS type.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading apparatus, comprising:

a transparent platen plate portion on which a document is placed;

a scanning unit including a light emitting portion and a light guiding portion, each of which is arranged along a main scanning direction, and configured to be movable in a first direction intersecting the main scanning direction and a second direction opposite to the first direction in a movable area including an area below the platen plate portion;

a main image sensor configured to receive light guided by the light guiding portion and output a line image signal representing an amount of received light;

a unit driving device configured to move the scanning unit in the first direction or the second direction within the movable area;

a control portion configured to control the main image sensor and the unit drive device and process line image data including a plurality of pixel data corresponding to the line image signal output by the main image sensor; and a plurality of reference portions arranged along the first direction in a reference area outside a main area on the platen plate portion in the main scanning direction in which the document can be placed, each of the reference portions having a lower surface of one of a plurality of predetermined reference colors; wherein the control portion sets a reference data offset value based on one or more reference pixel data of the reference area in the line image data obtained in a state where the light emitting portion is not caused to emit light;

the control portion further executes a color determination process to correct the reference pixel data in the line image data obtained in a state where the light emitting portion is caused to emit light with the reference data offset value, and to determine which of the plurality of determination colors the corrected reference pixel data is data of; and the control portion even further positions the scanning unit at a home position on the first direction side relative to the platen plate portion by causing the unit driving device to execute a plurality of driving operations that are sequentially selected from a plurality of trial driving operations that each differ in direction or distance by which the scanning unit is moved according to the determination result of the color determination process.

2. The image reading apparatus according to claim 1, wherein the control portion sets a main data offset value based on a plurality of main pixel data of the main area in the line image data obtained in a state in which the light emitting portion is not caused to emit light after the scanning unit is positioned at the home position; and when a document reading process is executed to read an image of the document on the platen plate portion, the control portion further corrects the plurality of main pixel data in the line image data obtained in a state where the light emitting portion is caused to emit light with the main data offset value.

3. The image reading apparatus according to claim 1, wherein the plurality of determination colors include a first color, a second color, and a third color; and the plurality of reference portions include a first reference portion arranged along a side edge that forms one end of the platen plate portion in the main scanning direction and having a lower surface of the first color;

a second reference portion arranged adjacent to the first reference portion in the first direction and having a lower surface of the second color; and a terminal reference portion arranged adjacent to the first reference portion in the second direction in an area at an end of the movable area in the second direction, and having a lower surface of the third color.

4. The image reading apparatus according to claim 3, wherein the first color is black;

the second color is white; and the third color is red, green, blue, yellow, magenta, or cyan.

5. The image reading apparatus according to claim 3, including a white reference portion arranged along the main scanning direction on the first direction side of the platen plate portion and having a white lower surface; wherein the second color is white; and the white reference portion includes the second reference portion.

6. The image reading apparatus according to claim 3, wherein the plurality of trial driving operations include:

a first pre-adjustment operation in which, when it is determined that the reference pixel data is not data of the third color, the unit driving device moves the scanning unit in the second direction by a first pre-adjustment distance;

a second pre-adjustment operation in which, when the reference pixel data is determined to be the third color, the unit driving device moves the scanning unit in the first direction by a second pre-adjustment distance that is longer than the first pre-adjustment distance;

a rough adjustment operation in which, when the reference pixel data is determined to be the first color data after the first pre-adjustment operation or the second pre-adjustment operation is performed, the unit driving device moves the scanning unit one or more times in the first direction by a rough adjustment distance shorter than the first pre-adjustment distance until the reference pixel data is determined to be the second color data;

a second rough adjustment operation in which, when the reference pixel data is determined to be the second color data after the first rough adjustment operation or the second pre-adjustment operation is performed, the unit driving device moves the scanning unit in the second direction by the rough adjustment distance;

a fine adjustment operation in which, when the reference pixel data is determined to be the first color data after the second rough adjustment operation is performed, the unit driving device moves the scanning unit one or more times in the first direction by a reference distance shorter than the rough adjustment distance until the reference pixel data is determined to be the second color data; and a completion driving operation in which, when it is determined that the reference pixel data is the second color data after the fine adjustment operation is performed, the unit driving device moves the scanning unit in the first direction by a final adjustment distance to position the scanning unit at the home position.

7. The image reading apparatus according to claim 3, comprising a transparent contact plate portion arranged on the first direction side of the platen plate portion; and a document conveying configured to convey the document along a conveying path via an upper surface of the contact plate portion; wherein the plurality of reference portions include a third reference portion arranged adjacent to the second reference portion in the first direction and having a lower surface of the first color; and a fourth reference portion arranged adjacent to the third reference portion in the first direction and having a lower surface of the second color; wherein the home position is a position between the platen plate portion and the contact plate portion.

8. The image reading apparatus according to claim 7, comprising:

a first white reference portion arranged along the main scanning direction in an area between the platen plate portion and the contact plate portion in a sub-scanning direction that is along the first direction and the second direction, and having a white lower surface;

a second white reference portion arranged along the main scanning direction in an area between the platen plate portion and the contact plate portion in the sub-scanning direction and having a white upper surface; and a sub-image sensor arranged facing the upper surface of the second white reference portion and configured to read an image of an upper surface of the document conveyed by the document conveying device; wherein the second color is white;

one of the first white reference portion and the second white reference portion includes the second reference portion; and the other of the first white reference portion and the second white reference portion includes the fourth reference portion.

9. The image reading apparatus according to claim 7, wherein the plurality of trial driving operations include:

a first confirmation operation in which, when the reference pixel data is determined to be the second color data, the unit driving device moves the scanning unit in the first direction by a first confirmation distance;

a second confirmation operation in which, when it is determined that the reference pixel data is the second color data after the first confirmation operation is performed, the unit driving device moves the scanning unit in the second direction by a second confirmation distance;

a first pre-adjustment operation in which, when it is determined that the reference pixel data is not third color data, the unit driving device moves the scanning unit in the second direction by a first pre-adjustment distance;

a second pre-adjustment operation in which, when the reference pixel data is determined to be the third color, the unit driving device moves the scanning unit in the first direction by a second pre-adjustment distance that is longer than the first pre-adjustment distance;

a rough adjustment operation in which, when the reference pixel data is determined to be the first color data after the first pre-adjustment operation or the second pre-adjustment operation is performed, the unit driving device moves the scanning unit one or more times in the first direction by a rough adjustment distance shorter than the first pre-adjustment distance until the reference pixel data is determined to be the second color data;

a second rough adjustment operation in which, when the reference pixel data is determined to be the second color data after the first rough adjustment operation or the second pre-adjustment operation is performed, the unit driving device moves the scanning unit in the second direction by the rough adjustment distance;

a fine adjustment operation in which, when the reference pixel data is determined to be the first color data after the second confirmation operation or the second rough adjustment operation is performed, the unit driving device moves the scanning unit one or more times in the first direction by a reference distance shorter than the rough adjustment distance until the reference pixel data is determined to be the second color data; and a completion driving operation in which, when it is determined that the reference pixel data is the second color data after the fine adjustment operation is performed, the unit driving device moves the scanning unit in the first direction by a final adjustment distance to position the scanning unit at the home position.

10. The image reading apparatus according to claim 1, wherein the scanning unit includes a contact image sensor unit having the light emitting portion, the light guiding portion that is a condensing lens, and the main image sensor of a CMOS type.

* * * * *